Nov. 2, 1926.
T. W. CASE
SLOT UNIT
Filed June 16, 1925
1,605,531
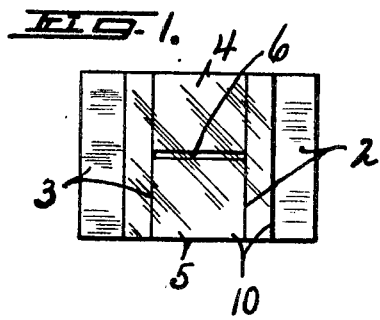
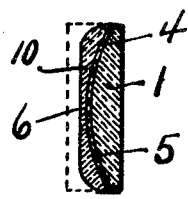
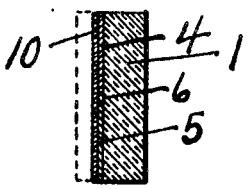
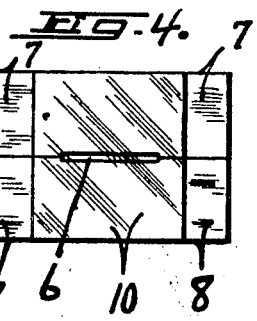
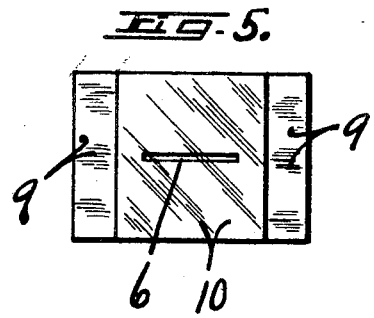
WITNESS
H. V. Hurst
INVENTOR
Theodore W. Case
BY Denison Thompson
ATTORNEYS Patented Nov. 2, 1926.

1,605,531

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

SLOT UNIT.

Application filed June 16, 1925. Serial No. 37,592.

This invention relates to a certain new and improved apparatus for taking, printing, or reproducing a film record and is particularly designed for use in producing a film record of light variations as caused by electrical variations preferably corresponding to sound-wave variations, as for instance, articulate sound waves, or for picture transmission or reception.

In apparatus of this character for producing or reproducing a film record of light variations, it has been customary to move the film past a small printing slot or opening in a wall disposed between the film and a source of light, and it is preferable that the film move past the slot in substantial contact with the wall so that only a portion of the film directly in front of the slot is exposed to the light emanating from the source, altho considerable spacing is possible under various conditions.

Considerable difficulty has been experienced in producing an accurate, clear and exact film record, and also in reproducing accurately the original sound from a record or in reproducing the original picture, due to the fact that dust, film material, or foreign matter collects in the slot,—more particularly as scraped off or left by the film as it passes by the edge of the slot, and this foreign material partially obstructs the slot which is extremely small, as for illustration .001 of an inch in width, and .1 of an inch in length, when used in talking picture work, or the slot may be round or square, and of very small area as when used in transmitting or receiving pictures, and the result is that the film record produced is somewhat unsatisfactory because of this obstruction of the slot, and for the same reason a reproduction of even a perfect film record or picture is unsatisfactory, and the object of this invention is the production of an apparatus retaining all the advantages of present similar apparatus, but in which this disadvantage is partially or wholly avoided.

More especially this invention is addressed to the production of a slot-containing unit of novel construction and adapted for use in either picture-taking, picture-transmitting or picture-reproducing apparatus, as above set forth, and to the method of producing such slot-containing unit.

Other objects and advantages relate to the details of the structure for effecting the main object of this invention, and to the particular method of producing the same, all as will more fully appear from the following description taken in connection with the accompanying drawings, in which:—

Figure 1 is an elevation of a slot-containing unit of this invention.

Figure 2 is a vertical central section therethrough.

Figure 3 is a vertical central section through a slightly modified form of this invention.

Figures 4 and 5 are elevations of slightly modified forms.

The slot-containing unit of Figures 1, 2 and 3 consists of a supporting sheet or plate of transparent material as the quartz or glass sheet —1— which may be of any desired shape and size. For the purpose of this disclosure, the word "glass" as used in the specification and claims hereof is deemed to include quartz. Upon one face of the glass piece 16 there is pasted, glued, cemented, or otherwise secured a layer of extremely thin sheet metal, as for illustration, extremely thin gold leaf. However, any metal rolled or otherwise reduced to the required thinness may be utilized, and preferably the layer as secured to the glass support —1— is formed of several pieces. In Figure 1, it is shown as formed of four pieces. In Figure 4 of two pieces, and in Figure 5 of a single piece.

The layer of metal should be sufficiently thick so as to be opaque, but should be of extreme thinness, preferably under .0005 of an inch, and under no circumstances in excess of .005 of an inch in thickness.

As illustrated in Figure 1, the metallic layer comprises two rectangular end pieces —2— and —3—, and two central substantially square pieces —4— and —5— spaced apart a distance sufficient to form the slot —6— which is of the desired width, as for instane, .001 of an inch. In this illustration, the sheet metal pieces —4— and —5— are of substantially the same width as the slot, as for instance .1 of an inch. However, it will be obvious that the slot —6— may be formed between or in an extremely thin sheet or sheets of metal in many and various ways with the sheet or sheets arranged in various ways upon the support —1—.

For further illustration in Figure 4 the metallic layer consists of two rectangular sheets of metal, as for instance, the upper sheet —7— and the lower sheet —8—. In this illustration, half of the slot —6— is formed in each of the thin sheets of metal —7— and —8—.

In Figure 5 a single sheet of metal —9— is utilized with a slot —6— formed therein in any suitable manner.

In the taking and reproducing of sound pictures, the elongated slot here shown is desirable, but in picture transmission and reproduction minute slots of other forms are utilized, as for instance, small circular or square slots, and the word "slot" as used in the specification and claims hereof is deemed to include any form and shape of opening, such as those described.

When the sheet metal has been secured in place upon the support —1— so as to form the slot —6— through which the support is exposed, a sheet —10— of transparent material, such as preferably glass is secured in place upon the metal layer by paste, cement, glue, Canada balsam, or other means, and altho the plate may be originally reduced to extreme thinness, it is preferably desirable to fix securely a thin sheet of glass or quartz in place upon the metallic layer so as to completely cover the slot, and then subsequently grind the covering glass sheet to the required thinness, as for instance .001 of an inch or less, in thickness. However, mica or other sheet of transparent material of the required thickness may be secured in place over the slot instead of glass or quartz.

In Figures 2 and 3 there is indicated in dotted lines the original form of the glass or covering sheet, and in full lines such cover sheet after grinding to the desired thickness, and while in Figure 2 the supporting member —1— is of rectangular form having a flat surface upon which the rolled metal layer is secured, in Figure 3 the supporting member —1— is formed with a cylindrical or curved surface upon which the rolled metal layer is secured, and when the glass cover sheet —10— is ground down, it is considerably thicker at its edges than at the central portion which overlies the slot —6— and the glass should be ground until the portion of the cover sheet overlying the slot is preferably of a thickness of .001 or less, and the opposite edges of the cover sheet may be rounded off as indicated to prevent harmful contact with the film or moving record.

Obviously the metal layer secured upon the face of the support —1— may consist of any number of pieces, and of any form so as to produce a continuous opaque surface, except for the slot —6—, and altho I have shown and described specific forms of the invention, I do not desire to restrict myself to the same, as various changes may be made within the scope of the appended claims.

I claim:

1. An apparatus for producing sound pictures on or reproducing sound pictures from a film comprising a layer of sheet metal of a thickness not greater than .005 of an inch and having a slot therethrough, a transparent cover sheet of a thickness not substantially greater than .005 of an inch extending over said slot, and a transparent cement rigidly securing said cover sheet to the layer of said metal.

2. In a slot unit, a transparent support, a layer of sheet metal of a thickness not greater than .005 of an inch secured thereto and having a slot therethrough, and a transparent cover sheet for the slot.

3. In a slot unit, a transparent support, a thin layer of rolled metal secured thereto, and of a thickness not substantially greater than .005 of an inch. and having a slot therethrough exposing the transparent support, and a thin transparent cover sheet secured over the open side of the slot.

4. In a slot unit, a glass support, a layer of sheet metal of a thickness approximating .0005 of an inch secured thereto and having a slot therethrough exposing the glass support and a thin transparent cover sheet secured across the open side of the slot.

5. In a slot unit a transparent support, a thin layer of sheet metal secured thereto and having a slot therethrough and a transparent cover sheet of a thickness not substantially greater than .001 of an inch for the slot.

6. In a slot unit, a transparent support, a layer of sheet metal of a thickness not greater than .005 of an inch secured thereto and having a slot therethrough, and a transparent cover sheet of a thickness not substantially greater than .001 of an inch for the slot.

7. In a slot unit, a transparent support, a thin layer of rolled metal secured thereto and of a thickness not substantially greater than .005 of an inch, and having a slot therethrough exposing the transparent support, and a thin transparent cover sheet of a thickness not substantially greater than .001 of an inch secured over the open side of the slot.

8. In a slot unit, a glass support, a layer of sheet metal of a thickness approximating .0005 of an inch secured thereto and having a slot therethrough exposing the glass support, and a thin transparent cover sheet of a thickness not substantially greater than .001 of an inch secured across the open side of the slot.

In witness whereof I have hereunto set my hand this 4th day of June 1925.

THEODORE WILLARD CASE.